United States Patent [19]

Uchida et al.

[11] Patent Number: 5,102,577

[45] Date of Patent: Apr. 7, 1992

[54] LIQUID CRYSTAL COMPOSITION AND LIQUID CRYSTAL DISPLAY DEVICE USING SAID COMPOSITION

[75] Inventors: Keiko Uchida; Taku Hirose; Shinichi Sawada, all of Ichiharashi, Japan

[73] Assignee: Chisso Corporation, Japan

[21] Appl. No.: 510,629

[22] Filed: Apr. 18, 1990

[30] Foreign Application Priority Data

Apr. 18, 1989 [JP] Japan ................... 1-98437

[51] Int. Cl.$^5$ .................. C09K 19/52; C09K 19/30; G02F 1/13
[52] U.S. Cl. .................. 252/299.01; 252/299.63; 359/103
[58] Field of Search ............. 252/299.01, 299.61, 252/299.63, 299.65; 359/103, 105

[56] References Cited

U.S. PATENT DOCUMENTS

| | | | |
|---|---|---|---|
| 3,925,482 | 12/1975 | Jacques | 260/612 |
| 4,130,502 | 12/1978 | Eidenschink et al. | 252/299 |
| 4,405,488 | 9/1983 | Sugimori et al. | 252/299.63 |
| 4,422,951 | 12/1983 | Sugimori et al. | 252/299.63 |
| 4,439,340 | 3/1984 | Kojima et al. | 252/299.63 |
| 4,507,222 | 3/1985 | Inoue et al. | 252/299.63 |
| 4,536,321 | 8/1985 | Sugimori et al. | 252/299.63 |
| 4,676,604 | 6/1987 | Petrzilka | 350/350 R |
| 4,770,503 | 9/1988 | Buchecker et al. | 350/350 R |
| 4,822,519 | 4/1989 | Saito et al. | 252/299.61 |
| 4,834,906 | 5/1989 | Coates et al. | 252/299.63 |
| 4,877,549 | 10/1989 | Sawada et al. | 252/299.63 |
| 4,944,577 | 7/1990 | Yoshida et al. | 350/346 |
| 5,030,383 | 7/1991 | Scheuble et al. | 252/299.61 |

FOREIGN PATENT DOCUMENTS 3601452 7/1987 Fed. Rep. of Germany .

Primary Examiner—Robert L. Stoll
Assistant Examiner—Shean C. Wu
Attorney, Agent, or Firm—Leydig, Voit & Mayer

[57] ABSTRACT

Liquid crystal compositions and display devices using the compositions are disclosed. The compositions contain, as main components, at least one compound of the general formula (I), and at least one compound of the general formula (II), or, as well as the above components, at least one compound selected from the compounds of the general formulas (III), (IV) and (V), and/or at least one compound of the general formula (VI).

General Formula (I):

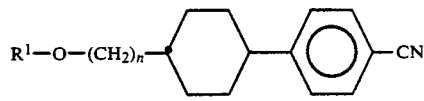

General Formula (II):

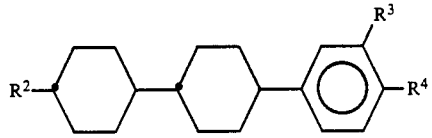

General Formula (III):

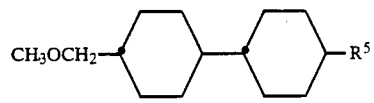

General Formula (IV):

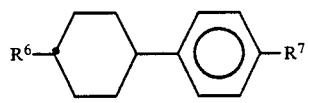

General Formula (V):

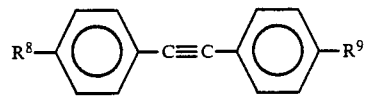

General Formula (VI):

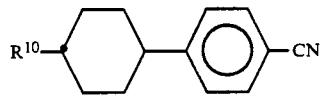

(wherein all the symbols are as defined in the appended claims).

18 Claims, No Drawings

LIQUID CRYSTAL COMPOSITION AND LIQUID CRYSTAL DISPLAY DEVICE USING SAID COMPOSITION

FIELD OF THE INVENTION

The present invention relates to a liquid crystal composition, and a liquid crystal display device using the liquid crystal composition. More particularly, it is concerned with a liquid crystal composition suitable for use in highly multiplexed display devices utilizing the supertwisted birefringence effect, and a liquid crystal display device using the liquid crystal composition.

BACKGROUND OF THE INVENTION

TN (twisted nematic) liquid crystal cells having a twist angle of 90° have heretofore been used as display terminals of about 1/100 duty cycle, such as watches and electric calculators. In view of the principle, however, it has been believed that it is difficult to increase the number of duty cycles to more than the above value, because it is accompanied by a reduction of display quality.

On the contrary, a supertwisted birefringence effect mode utilizing the birefringence effect of a liquid crystal cell in which the uppermost possible twist angle to produce bistability, one of electro-optic characteristics of a chiral nematic liquid crystal, is controlled between 180° and 270° can be used as a liquid crystal display device of about 1/400 duty cycle. This system is hereinafter referred to as an "SBE mode", including supertwisted nematic modes using an aligning organic film, called an STN mode and an HBE mode.

T. J. Scheffer & J. Nehling disclosed in Appl. Phys. Lett., 45, 1021 (1984) that the above SBE mode can provide a matrix display device to be driven by the same driving manner as that in a matrix display device of the conventional 90° twisted nematic mode, i.e., the fast scan addressing mode responding to the effective value of applied voltage. It is also disclosed that the SBE mode has a much higher contrast and a much wider viewing angle than the 90° TN display mode.

Liquid crystal compositions to be used in liquid crystal display devices of the SBE mode are required to have the characteristics described below.

(1) A voltage-transmittance curve which is steep. This characteristic, i.e., steepness of voltage-transmittance curve is necessary for increasing the display contrast of a liquid crystal display device of the SBE mode.

(2) A nematic-isotropic liquid phase transition temperature (hereinafter referred to as a "clearing point") which is high. In the SBE mode, it is desirable that the clearing point be as high as possible in order to prevent changes in color, due to temperature dependency of refractive index anisotropy.

(3) Viscosity ($\eta$) is low. In a liquid crystal cell of the SBE mode, it is desirable that the viscosity be as low as possible, because its response time is in proportion to $\eta \cdot d^2$ (wherein d indicates a cell thickness).

Conventional liquid crystal compositions, however, fail to satisfy the above requirements; a liquid crystal composition satisfying the above requirements has not been obtained heretofore.

SUMMARY OF THE INVENTION

An object of the present invention is to provide a liquid crystal composition, and particularly a liquid crystal composition suitable for use in liquid crystal display devices of the SBE mode.

Another object of the present invention is to provide a liquid crystal composition having a high clearing point and is excellent in the steepness of the voltage-transmittance curve.

Still another object of the present invention is to provide a nematic liquid crystal composition which has a high clearing point and a low viscosity, and is excellent in the steepness of the voltage-transmittance curve, and further which provides higher multiplexing.

Still another object of the present invention is to provide a liquid crystal display device of the SBE mode which is good in contrast.

It has been found that the above objects can be attained by combining specified liquid crystal compounds as defined hereinafter.

The present invention relates to a liquid crystal composition containing:

at least one compound represented by the general formula (I) (hereinafter referred to as the "first component"); and at least one compound represented by the general formula (II) (hereinafter referred to as the "second component") as main components.

The present invention further relates to a liquid crystal composition containing:

as well as the above first, and second components, at least one compound selected from the compounds represented by the general formula (III), the compounds represented by the general formula (IV), and the compounds represented by the general formula (V) (hereinafter referred to as the "third component"), and/or at least one compound represented by the general formula (VI) (hereinafter referred to as the "fourth component") or as an "additional component" as main components.

The present invention further relates to a liquid crystal display device using any one of the above liquid crystal compositions.

As used herein:

General Formula (I):

wherein $R^1$ is an alkenyl group having 2 to 10 carbon atoms (preferably a linear alkenyl group having 2 to 10 carbon atoms), containing a double bond at any suitable position thereof, and when the double bond is located at a position other than the terminal, is in a trans configuration, and n is an integer of 0 to 4.

General Formula (II):

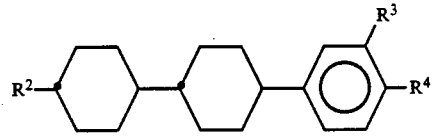

wherein $R^2$ is an alkyl group having 2 to 8 carbon atoms (preferably a linear alkyl group having 2 to 8 carbon atoms), $R^3$ is H or F; and $R^4$ is an alkyl group having 1 to 8 carbon atoms (preferably a linear alkyl group having 1 to 8 carbon atoms), an alkoxy group having 1 to 8 carbon atoms (preferably a linear alkoxy group having 1 to 8 carbon atoms), F, or a CN group;

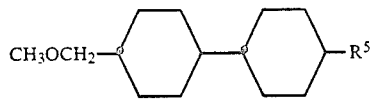

wherein $R^5$ is an alkyl group having 1 to 5 carbon atoms (preferably a linear alkyl group having 1 to 5 carbon atoms);

General Formula (IV):

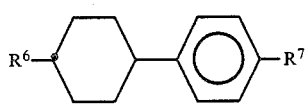

wherein $R^6$ is an alkyl group having 2 to 8 carbon atoms (preferably a linear alkyl group having 2 to 8 carbon atoms), and $R^7$ is an alkyl group having 1 to 8 carbon atoms (preferably a linear alkyl group having 1 to 8 carbon atoms), or an alkoxy group having 1 to 8 carbon atoms (preferably a linear alkoxy group having 1 to 8 carbon atoms);

General Formula (V):

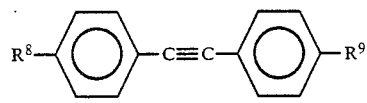

wherein $R^8$ is an alkyl group having 1 to 8 carbon atoms (preferably a linear alkyl group having 1 to 8 carbon atoms), and $R^9$ is an alkyl group having 1 to 8 carbon atoms (preferably a linear alkyl group having 1 to 8 carbon atoms), or an alkoxy group having 1 to 8 carbon atoms (preferably a linear alkoxy group having 1 to 8 carbon atoms);

General Formula (VI):

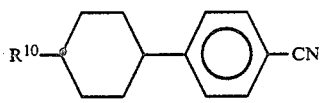

wherein $R^{10}$ is an alkyl group having 2 to 10 carbon atoms (preferably a linear alkyl group having 2 to 10 carbon atoms), or an alkenyl group having 2 to 10 carbon atoms (preferably a linear alkenyl group having 2 to 10 carbon atoms).

In the present invention,

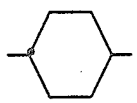

indicates a trans-cyclohexylene ring, and

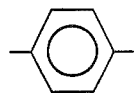

indicates a p-phenylene ring.

DETAILED DESCRIPTION OF THE INVENTION

The first component of the present invention, as described above, comprises one or more of the compounds represented by the general formula (I). Of these compounds, compounds of the general formula (I) in which $R^1$ is a linear alkenyl group having 2 to 6 carbon atoms, and a double bond at the terminal thereof, i.e., a terminal vinyl group, and n is an integer of 1 to 4 are preferably used.

Examples of such preferred compounds are 4-{trans-4-(allyloxymethyl)cyclohexyl}benzonitrile, 4-{trans-4-(allyloxyethyl)cyclohexyl}benzonitrile, 4-{trans-4-(allyloxypropyl)cyclohexyl}benzonitrile, 4-{trans-4-(allyloxybutyl)cyclohexyl}benzonitrile, 4-{trans-4-butenyloxymethyl)cyclohexyl}benzonitrile, 4-{trans-4-(4-butenyloxyethyl)cyclohexyl}benzonitrile, 4-{trans-4-(4-butenyloxypropyl)cyclohexyl}benzonitrile, and 4-(trans-4-allyloxycyclohexyl)benzonitrile.

The compounds of the general formula (I) can be synthesized by the methods proposed in Japanese Patent Application No. 234531/1988 and U.S. patent application Ser. No. 07/407,286, the latter incorporated herein by reference. For example, they can be easily prepared by reacting a compound (a) and a compound (b), both being shown below, in an inert solvent, e.g., tetrahydrofuran in the presence of a base, e.g., sodium hydride according to the following reaction scheme wherein $R^1$ has the same meaning as indicated above and X is a halogen atom of chlorine, bromine, or iodine, or other leaving group, preferably such as a tosyloxy or mesyloxy group.

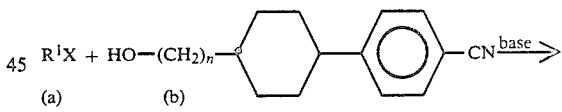
(a)  (b)

The compounds of the general formula (I) have a feature to contribute to provide a large positive dielectric anisotropy (Δε) to a liquid crystal mixture containing them, even though most of the compounds do not have a nematic phase.

When two or more of the compounds of the general formula (I) are used in combination with each other as the first component, the proportions of the compounds used are not critical and can be determined suitably depending on the desired characteristics of the liquid crystal composition to be prepared.

The second component of the present invention comprises one or more of the compounds represented by the general formula (II). Of the compounds of the general formula (II), compounds represented by the general formulas shown below are preferably used.

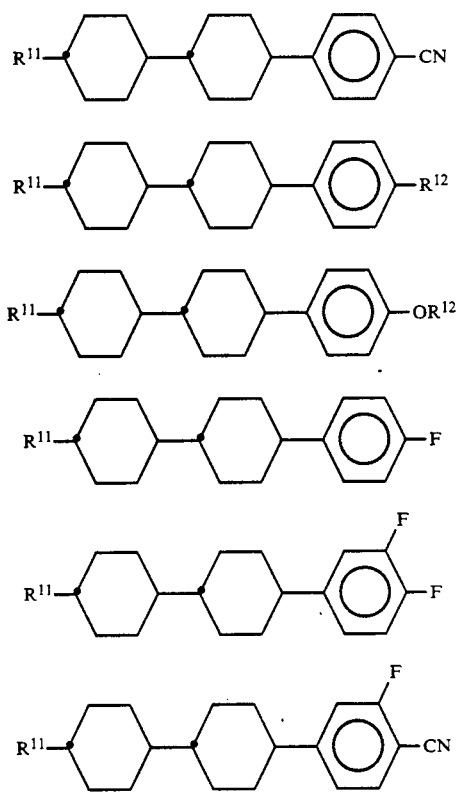

(wherein R¹¹ is a linear alkyl group having 2 to 6 carbon atoms; and R¹² is a linear alkyl group having 1 to 5 carbon atoms).

Examples of such preferred compounds are shown below.

4-{Trans-4-(trans-4-ethylcyclohexyl)cyclohexyl}benzonitrile, 4-{trans-4-(trans-4-propylcyclohexyl)cyclohexyl}benzonitrile, 4-{trans-4-(trans-4-butylcyclohexyl)cyclohexyl}benzonitrile, 4-{trans-4-(trans-4-pentylcyclohexyl)cyclohexyl}benzonitrile, 4-{trans4-(trans-4-heptylcyclohexyl)cyclohexyl}benzonitrile, 4-{trans-4-(trans-4-ethylcyclohexyl)cyclohexyl}methylbenzene, 4-{trans-4-(trans-4-ethylcyclohexyl)cyclohexyl}ethylbenzene, 4-{trans-4-(trans-4-propylcyclohexyl)-cyclohexyl}methylbenzene, 4-{trans-4-(trans-4-butylcyclohexyl)cyclohexyl}methylbenzene, 4-{trans-4-(trans-4-propylcyclohexyl)cyclohexyl}ethylbenzene, 4-{trans-4-(trans-4-ethylcyclohexyl)cyclohexyl}propylbenzene, 4-{trans-4-(trans-4-propylcyclohexyl)cyclohexyl}propylbenzene, 4-{trans-4-(trans-4-ethylcyclohexyl)cyclohexyl}methoxybenzene, 4-{trans-4-(trans-4-ethylcyclohexyl)cyclohexyl}ethoxybenzene, 4-{trans-4-(trans-4-propylcyclohexyl)cyclohexyl}methoxybenzene, 4-{trans-4-(trans-4-propylcyclohexyl)cyclohexyl}ethoxybenzene, 4-{trans-4-(trans-4-propylcyclohexyl)cyclohexyl}propoxybenzene, 4-{trans-4-(trans-4-ethylcyclohexyl)cyclohexyl}fluorobenzene, 4-{trans-4-(trans-4-propylcyclohexyl)cyclohexyl}fluorobenzene, 4-{trans-4-(trans-4-butylcyclohexyl)cyclohexyl}fluorobenzene, 4-{trans-4-(trans-4-pentylcyclohexyl)cyclohexyl}fluorobenzene, 4-{trans-4-(trans-4-ethylcyclohexyl)cyclohexyl}-1,2-difluorobenzene, 4-{trans-4-(trans-4-propylcyclohexyl)cyclohexyl}-1,2-difluorobenzene, 4-{trans-4-(trans-4-butylcyclohexyl)cyclohexyl}-1,2-difluorobenzene, and 4-{trans-4-(trans-4-pentylcyclohexyl)cyclohexyl}-1,2-difluorobenzene.

The compounds of the general formula (II) are known and are described in, for example, Japanese Patent Application Laid-Open Nos. 154135/1982, 165328/1982, 10552/1983, and 152362/1984.

The compounds of the general formula (II) are low in viscosity, although they are three-ring compounds, and they are thermally stable liquid crystal compounds having a clearing point falling within the range of about 100° to 250° C.

When two or more of the compounds of the general formula (II) are used in combination with each other as the second component, the proportions of the compounds used are not critical and can be determined suitably depending on the desired characteristics of the liquid crystal composition to be prepared.

The third component comprises one or more compounds selected from the compounds represented by the general formula (III), the compounds represented by the general formula (IV), and the compounds represented by the general formula (V).

Of the compounds represented by the general formula (III), compounds of the general formula (III) in which R⁵ is a linear alkyl group having 1 to 5 carbon atoms are preferably used.

Examples of such preferred compounds are trans-4-(trans-4-methoxymethylcyclohexyl)ethylcyclohexane, trans-4-(trans-4-methoxymethylcyclohexyl)propylcyclohexane, trans-4-(trans-4-methoxymethylcyclohexyl)butylcyclohexane, and trans-4-(trans-4-methoxymethylcyclohexyl)pentylcyclohexane.

Of the compounds represented by the general formula (IV), compounds of the general formula (IV) in which R⁶ is a linear alkyl group having 2 to 5 carbon atoms, and R⁷ is a linear alkyl group having 1 to 5 carbon atoms, or a linear alkoxy group having 1 to 5 carbon atoms are preferably used.

Examples of such preferred compounds are 4-(trans-4-ethylcyclohexyl)ethylbenzene, 4-(trans-4-propylcyclohexyl)ethylbenzene, 4-(trans-4-butylcyclohexyl)ethyl-benzene, 4-(trans-4-ethylcyclohexyl)propylbenzene, 4-(trans-4-pentylcyclohexyl)propylbenzene, 4-(trans4-ethylcyclohexyl)butylbenzene, 4-(trans-4-ethylcyclohexyl)ethoxybenzene, 4-(trans-4-propylcyclohexyl)ethoxybenzene, 4-(trans-4-propylcyclohexyl)propoxybenzene, and 4-(trans-4-propylcyclohexyl)butoxybenzene.

Of the compounds represented by the general formula (V), compounds of the general formula (V) in which R⁸ is a linear alkyl group having 1 to 6 carbon atoms, and R⁹ is a linear alkyl group having 1 to 6 carbon atoms, or a linear alkoxy group having 1 to 6 carbon atoms are preferably used.

Examples of such preferred compounds are 4-ethyl4'-methyldiphenylacetylene, 4-propyl-4'-methyldiphenylacetylene, 4-butyl-4'-methyldiphenylacetylene, 4,4'-diethyldiphenylacetylene, 4,4'-dipropyldiphenylacetylene, 4,4'-dibutyldiphenylacetylene, 4-methyl-4'-pentyldiphenylacetylene, 4-methyl-4'-hexyldiphenylacetylene, 4-propyl-4'-pentyldiphenylacetylene, and 4-butyl-4'-pentyldiphenylacetylene.

All the compounds represented by the above general formulas (III), (IV), and (V) are known. For example, compounds of the general formula (III) are described in, for example, Japanese Patent Application Laid-Open No. 167535/1983; compounds of the general formula (IV), in U.S. Pat. No. 4,130,502, etc.; and compounds of the general formula (V), in French Patent 2,141,438, etc.

Since the compounds of the general formulas (III), (IV), and (V) are low in viscosity, they are essential for shortening the response time of a liquid crystal display device of the SBE mode. Moreover, the clearing points of the compounds are as low as about 10° to 50° C.

The third component of the present invention comprises one or more of the compounds represented by the general formulas (III), (IV), and (V). As a matter of course, two or more of the compounds represented by the general formula (III), or two or more of the compounds represented by the general formula (IV), or two or more of the compounds represented by the general formula (V) may be used. When a plurality of compounds are used in combination, the proportions of the compounds used are not critical and can be determined appropriately depending on the desired characteristics of the liquid crystal composition to be prepared.

The fourth additional component comprises one or more of the compounds represented by the general formula (VI). Of the compounds of the general formula (VI), compounds of the general formula (VI) in which $R^{10}$ is a linear alkyl group having 2 to 8 carbon atoms, or a linear alkenyl group having 2 to 8 carbon atoms are preferably used.

Examples of such preferred compounds are 4-(tran-4-ethylcyclohexyl)benzonitrile, 4-(trans-4-propylcyclohexyl)benzonitrile, 4-(trans-4-butylcyclohexyl)benzonitrile, 4-(trans-4-pentylcyclohexyl)benzonitrile, 4-(trans-4-heptylcyclohexyl)benzonitrile, 4-(2-propenyl)cyclohexyl}benzonitrile, 4-{trans-4-(3-butenyl)cylohexyl}benzonitrile, 4-{trans-4-(2-butenyl)cyclohexyl}benzonitrile, 4-{trans-4-(4-pentenyl)cyclohexyl}benzonitrile, and 4-{trans-4-(2-pentenyl)cyclohexyl}benzonitrile.

The compounds of the general formula (VI) are known and are described in, for example, Japanese Patent Application Laid-Open No. 176221/1984.

The compounds of the general formula (VI) have a feature that Δε is positive and is large, and viscosity is low. Moreover, they have a clearing point as low as about 30° to 70° C.

When two or more of the compounds of the general formula (VI) are used in combination with each other, the proportions of the compounds used are not critical and can be determined appropriately depending on the desired characteristics of the liquid crystal composition to be prepared.

The liquid crystal composition of the present invention, in one embodiment thereof, contains the first, and second components as main components. In another embodiment, the liquid crystal composition contains the first, second, and third components as main components. In another embodiment, the liquid crystal composition contains the first, second, and fourth components as main components. In another embodiment, the liquid crystal composition contains the first, second, third, and fourth components as main components.

The liquid crystal composition of the present invention may contain, as well as the above components, suitable amounts of other conventionally known liquid crystal compound or mesogenic compound for the purpose of e.g., controlling threshold voltage or nematic range, within a range that does not deteriorate the effects of the present invention.

Typical examples of compounds which can be used additionally for the above purpose include the compounds represented by the following general formulas:

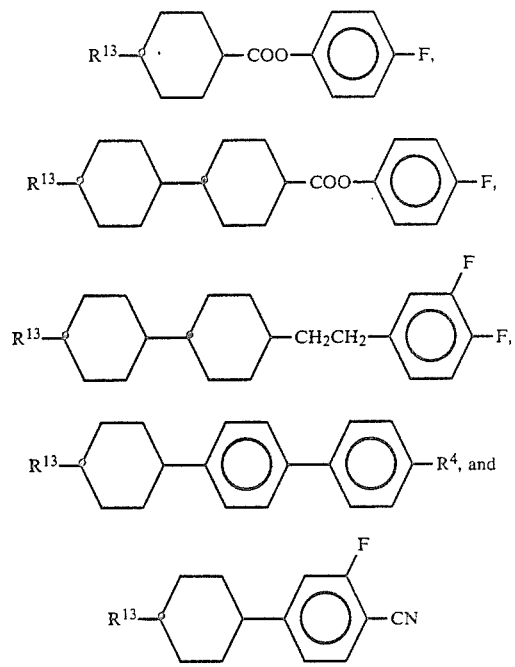

(wherein $R^{13}$ is an alkyl group having 2 to 8 carbon atoms, and $R^{14}$ is an alkyl group having 2 to 8 carbon atoms or an alkoxy group having 2 to 8 carbon atoms).

Specific examples of the above typical compounds are {trans-4-(trans-4-ethylcyclohexyl)cyclohexyl}ethyl-3,4-difluorobenzene, {trans-4-(trans-4-propylcyclohexyl)cyclohexyl}ethyl-3,4-difluorobenzene, {trans-4-(trans-4-pentylcyclohexyl)cyclohexyl}ethyl3,4-difluorobenzene, 4-(trans-4-pentylcyclohexyl)-4'-ethylbiphenyl, 4-fluorophenyl trans-4-propylcyclohexanecarboxylate, 4-fluorophenyl trans-4-pentylcyclohexanecarboxylate, 4-fluorophenyl trans-4-heptylcyclohexanecarboxylate, 4-fluorophenyl trans-4-(trans-4-propylcyclohexyl)cyclohexanecarboxylate, 4-fluorophenyl trans4-(trans-4-pentylcyclohexyl)cyclohexanecarboxylate, 4-(trans-4-ethylcyclohexyl)-2-fluorobenzonitrile, 4-(trans-4-propylcyclohexyl)-2-fluorobenzonitrile, 4-(trans-4-butylcyclohexyl)-2-fluorobenzonitrile, 4-(trans-4-pentylcyclohexyl)-2-fluorobenzonitrile, and 4-(trans-4-heptylcyclohexyl)-2-florobenzonitrile.

The liquid crystal composition of the present invention, in one embodiment thereof, contains the first, and second components as main components.

The proportion of the first component in the liquid crystal composition is preferably 10 to 40% by weight based on the total weight of the liquid crystal composition, and the proportion of the second component is preferably 30 to 70% by weight based on the total weight of the liquid crystal composition.

If the proportion of the first component is less than 10% by weight, threshold voltage of voltage-transmittance characteristics is not sufficiently decreased. On the other hand, if the proportion of the first component is more than 40% by weight, the clearing point of the resulting liquid crystal composition is sometimes markedly lowered. This markedly low clearing point is undesirable because it exerts an adverse influence that temperature dependency of refractive index anisotropy (Δn) is increased, causing changes in an optical path (d·Δn) of birefringence, and thus changes in color.

If the proportion of the second component is less than 30% by weight, the clearing point of the resulting liquid crystal composition is decreased. This decrease in clearing point is undesirable because it exerts the aforementioned adverse influence. On the other hand, if the proportion of the second component is more than 70% by weight, in some cases, the lower limit temperature of a nematic phase is increased, and the operating temperature range is narrowed.

In another embodiment, the liquid crystal composition of the present invention contains the first, second, and third components as main components.

The proportions of the first, and second components in the liquid crystal composition are preferably 10 to 40% by weight, and 30 to 70% by weight, respectively, based on the total weight of the liquid crystal composition, as in the above embodiment. The proportion of the third component is preferably 10 to 30% by weight based on the total weight of the liquid crystal composition. If the proportion of the third component is less than 10% by weight, the effect of decreasing viscosity by addition of the third component is not sufficiently obtained, and a liquid crystal composition having a short response time is not obtained. On the other hand, if the proportion of the third component is more than 30% by weight, the clearing point is reduced exerting adverse influences as described above.

In another embodiment, the liquid crystal composition of the present invention contains the first, second, and fourth or additional components as main components.

The proportions of the first, and second components in the liquid crystal composition are preferably 10 to 40% by weight, and 30 to 70% by weight, respectively, based on the total weight of the liquid crystal composition, as in the above embodiments. The proportion of the fourth or additional component is preferably 10 to 30% by weight based on the total weight of the liquid crystal composition.

If the proportion of the additional component is less than 10% by weight, the threshold voltage is not sufficiently decreased depending on a combination of the first, and second components. On the other hand, if the proportion of the fourth component is more than 30% by weight, in some cases, the clearing point lowers, exerting the adverse influence as described above.

In another embodiment, the liquid crystal composition of the present invention contains the first, second, third, and fourth components as main components.

The proportions of the first, second, third, and fourth components in the liquid crystal composition are preferably 10 to 40% by weight, 30 to 70% by weight, 10 to 30% by weight, and 10 to 30% by weight, respectively, based on the total weight of the liquid crystal composition, as in the above embodiments.

In preparation of a liquid crystal composition by addition of the aforementioned conventionally used liquid crystals or mesogenic compounds to the first, and second components, or the first, second, and third components, or the first, second, and fourth components, or the first, second, third, and fourth components, it is preferred that the total amount of the first, and second components, or the first, second, and third components, or the first, second, and fourth components, or the first, second, third, and fourth components be at least 60% by weight based on the total weight of the liquid crystal composition. If the above total amount is less than 60% by weight, in some cases, the desired characteristics required particularly for the SBE mode, such as steepness of the voltage-transmittance curve, low viscosity, etc. and further a wide nematic range are not obtained.

The liquid crystal display device of the present invention can be produced by known techniques except that the liquid crystal composition of the present invention is used as a liquid crystal. For example, it can be produced by the following process.

First, a pair of transparent electrodes is formed on a glass substrate. Then, after formation of a molecular aligning coating on the substrate using a molecular aligning agent, a cell is fabricated. After the cell is sealed with a spacer, for example, the liquid crystal composition is introduced into the cell through a filling hole, and then the filling hole is sealed. Attachments such as polarizers and reflective plates are attached to obtain a liquid crystal display device.

The liquid crystal composition of the present invention is improved satisfactorily in characteristics required for a liquid crystal composition to be used in liquid crystal display devices of the SBE mode. In particular, a decrease in threshold voltage and an increase in the steepness of the voltage-transmittance curve are attained satisfactorily while maintaining a high clearing point.

The liquid crystal composition of the present invention is particularly suitable for use in liquid crystal display devices of the multiplexing display mode, because the alpha ($\alpha$) value of the composition, indicating the steepness of the voltage-transmittance curve, approaches 1. It is believed that in particular, use of the first component of the present invention, i.e., the compounds of the general formula (I), greatly improves the steepness of the voltage-transmittance curve.

The liquid crystal composition of the present invention, prepared by combining the first, and second components, or the first, second, and third components, or the first, second, and fourth components, or the first, second, third, and fourth components as described above in suitable proportions, is improved in a well-balanced manner in, as well as the steepness of the voltage-transmittance curve, various characteristics as described above.

With the liquid crystal composition of the present invention having various characteristics as described above, multiplexing of 1/100 to 1/300 duty cycle, exceeding 1/100 duty cycle providing high contrast in the supertwisted birefringence system is realized.

The liquid crystal composition of the present invention can be also used effectively in the 90° TN mode which does not always need the steepness of the voltage-transmittance curve.

Use of the liquid crystal composition of the present invention, having characteristics as described above, provides a liquid crystal display device which is excellent in the steepness of the voltage-transmission curve, is of high multiplexing, and further which is good in contrast.

The present invention is described in greater detail with reference to the following examples.

In the examples, percents (%) are all by weight, and alkyl and alkoxy groups are all linear.

Characteristic values of the liquid crystal compositions were measured by the following methods.

Steepness of the Voltage-Transmittance Curve ($\alpha$)

Assuming that voltages at which transmittance of light in an optical axis direction vertical to a display surface are 10% and 80% of a saturated value are indicated by $V_{10}$ and $V_{80}$, respectively, the steepness of the voltage-transmittance curve is evaluated by a parameter ($\alpha$) defined by the equation:

$$\alpha = V_{80}/V_{10}$$

(wherein $V_{10}$ = threshold voltage).

As the parameter ($\alpha$) approaches to 1, the voltage-transmittance curve becomes more steep.

$V_{10}$ and $V_{80}$ are measured by the following method.

A test sample is prepared by adding a chiral substance (trade name: S-811, produced by Merck and Co.) to a liquid crystal composition in such a manner that d/p=0.42 (wherein d indicates a cell thickness, and p indicates an intrinsic helical pitch of a chiral nematic liquid crystal) at which there is no formation of either lower twist or striped domain. This sample is placed in a cell which has a polyimide-based aligning film (trade name: PSI-871-PPP, produced by Chisso Corp.) subjected to rubbing on the opposing plane transparent electrodes, and which has a twist angle of 180°, under the condition that $\Delta n \cdot d = 800$ nm. Polarizing plates are placed across the cell in such a manner that the rubbing direction of the aligning film and the absorption axis of the polarizing plate are at an angle of 45°, and the absorption axes of the upper and lower polarizing plates are overlapped. Thereafter, $V_{10}$ and $V_{80}$ are measured.

The above aligning film has a pretilt angle of 3.5° when a phenylcyclohexane-based liquid crystal composition (trade name: ZLI-1132, produced by Merck & Co.) is employed. The pretilt angle is measured by the crystal rotation method (T. J. Scheffer et al., Journal of Applied Physics, Vol 48, No. 5, pp. 1783-1792 (1977)).

Number of Multiplexing (Nmax)

The multiplex numbers defined by the following equation:

$$N\text{max} = \left( \frac{\alpha^2 + 1}{\alpha^2 - 1} \right)^2.$$

As the Nmax is larger, higher multiplexing becomes possible.

Viscosity ($\eta$)

Measured with a rotation viscometer (E-type viscometer manufactured by Tokyo Keiki Co., Ltd.).

Clearing Point

Measured with an automatic melting point measuring apparatus (FP5, FP52 manufactured by Mettler Instrumente 15 AG.).

Refractive Index Anisotropy ($\Delta n$)

Measured by the use of Micro-Refractometer (manufactured by Ernst Leitz Gmbh Wetzlar) (wavelength: 589 nm).

EXAMPLE 1

| First Component | |
|---|---|
| 4-{Trans-4-(allyloxymethyl)cyclohexyl}benzonitrile | 30% |
| Second Component | |
| 4-{Trans-4-(trans-4-ethylcyclohexyl)cyclohexyl}-benzonitrile | 10% |
| 4-{Trans-4-(trans-4-propylcyclohexyl)cyclohexyl}-benzonitrile | 10% |
| 4-{Trans-4-(trans-4-pentylcyclohexyl)cyclohexyl}-benzonitrile | 10% |
| 4-{Trans-4-(trans-4-ethylcyclohexyl)cyclohexyl}-1,2-difluorobenzene | 10% |
| 4-{Trans-4-(trans-4-propylcyclohexyl)cyclohexyl}-1,2-difluorobenzene | 10% |
| 4-{Trans-4-(trans-4-pentylcyclohexyl)cyclohexyl}-1,2-difluorobenzene | 10% |
| 4-{Trans-4-(trans-4-propylcyclohexyl)cyclohexyl}-propylbenzene | 10% |

The above compounds were mixed to prepare a liquid crystal composition. Characteristic values of the liquid crystal composition are shown in Table 1.

EXAMPLE 2

| First Component | |
|---|---|
| 4-{Trans-4-(3-butenyloxymethyl)cyclohexyl}benzonitrile | 10% |
| 4-{Trans-4-(allyloxymethyl)cyclohexyl}benzonitrile | 20% |
| Second Component | |
| 4-{Trans-4-(trans-4-ethylcyclohexyl)cyclohexl}-benzonitrile | 10% |
| 4-{Trans-4-(trans-4-propylcyclohexyl)cyclohexyl}-benzonitrile | 10% |
| 4-{Trans-4-(trans-4-pentylcyclohexyl)cyclohexyl}-benzonitrile | 10% |
| 4-{Trans-4-(trans-4-propylcyclohexyl)cyclohexyl}-propylbenzene | 15% |
| Third Component | |
| Trans-4-(trans-4-methoxymethylcyclohexyl)propylcyclohexane | 15% |
| Trans-4-(trans-4-methoxymethylcyclohexyl)pentylcyclohexane | 10% |

The above compounds were mixed to prepare a liquid crystal composition. Characteristic values of the liquid crystal composition are shown in Table 1.

EXAMPLE 3

| First Component | |
|---|---|
| 4-{Trans-4-(allyloxyethyl)cyclohexyl}benzonitrile | 20% |
| Second Component | |
| 4-{Trans-4-(trans-4-ethylcyclohexyl)cyclohexyl}-benzonitrile | 10% |
| 4-{Trans-4-(trans-4-propylcyclohexyl)cyclohexyl}-benzonitrile | 10% |
| 4-{Trans-4-(trans-4-ethylcyclohexyl)cyclohexyl}-1,2-difluorobenzene | 10% |
| 4-{Trans-4-(trans-4-propylcyclohexyl)cyclohexyl}-1,2-difluorobenzene | 10% |
| 4-{Trans-4-(trans-4-pentylcyclohexyl)cyclohexyl}-1,2-difluorobenzene | 10% |
| Third Component | |
| 4-Ethyl-4'-methyldiphenylacetylene | 2.5% |
| 4,4'-Dibutyldiphenylacetylene | 2.5% |
| 4-Hexyl-4'-methyldiphenylacetylene | 5% |
| Fourth Component | |
| 4-(Trans-4-pentylcyclohexyl)benzonitrile | 20% |

The above compounds were mixed to prepare a liquid crystal composition. Characteristic values of the liquid crystal composition are shown in Table 1.

EXAMPLE 4

| First Component | |
|---|---|
| 4-{Trans-4-(3-butenyloxymethyl)cyclohexyl}benzonitrile | 20% |
| 4-{Trans-4-(allyloxymethyl)cyclohexyl}benzonitrile | 20% |
| Second Component | |
| 4-{Trans-4-(trans-4-ethylcyclohexyl)cyclohexyl}-benzonitrile | 10% |
| 4-{Trans-4-(trans-4-propylcyclohexyl)cyclohexyl}-benzonitrile | 10% |

-continued

| | |
|---|---|
| 4-{Trans-4-(trans-4-ethylcyclohexyl)cyclohexyl}-methylbenzene | 5% |
| 4-{Trans-4-(trans-4-propylcyclohexyl)cyclohexyl}-methoxybenzene | 5% |
| 4-{Trans-4-(trans-4-propylcyclohexyl)cyclohexyl}-fluorobenzene | 5% |
| Fourth Component | |
| 4-{Trans-4-(3-butenyl)cyclohexyl}benzonitrile | 10% |
| Other Compounds | |
| Trans-4-(trans-4-propylcyclohexyl)cyclohexyl-ethyl-3,4-difluorobenzene | 7% |
| Trans-4-(trans-4-pentylcyclohexyl)cyclohexyl-ethyl-3,4-difluorobenzene | 8% |

The above compounds were mixed to prepare a liquid crystal composition. Characteristic values of the liquid crystal composition are shown in Table 1.

EXAMPLE 5

| | |
|---|---|
| First Component | |
| 4-{Trans-4-(allyloxymethyl)cyclohexyl}benzonitrile | 10% |
| Second Component | |
| 4-{Trans-4-(trans-4-ethylcyclohexyl)cyclohexyl}-benzonitrile | 10% |
| 4-{Trans-4-(trans-4-propylcyclohexyl)cyclohexyl}-benzonitrile | 10% |
| 4-{Trans-4-(trans-4-pentylcyclohexyl)cyclohexyl}-benzonitrile | 10% |
| Third Component | |
| 4-(Trans-4-propylcyclohexyl)ethoxybenzene | 15% |
| Fourth Component | |
| 4-(Trans-4-propylcyclohexyl)benzonitrile | 30% |
| Other Compound | |
| 4-(Trans-4-pentycyclohexyl)-4'-ethylbiphenyl | 15% |

The above compounds were mixed to prepare a liquid crystal composition. Characteristic values of the liquid crystal composition are shown in Table 1.

EXAMPLE 6

| | |
|---|---|
| First Component | |
| 4-{Trans-4-(allyloxypropyl)cyclohexyl}benzonitrile | 10% |
| 4-{Trans-4-(allyloxybutyl)cyclohexyl}benzonitrile | 14% |
| Second Component | |
| 4-{Trans-4-(trans-4-ethylcyclohexyl)cyclohexyl}-methylbenzene | 6% |
| 4-{Trans-4-(trans-4-propylcyclohexyl)cyclohexyl}-methylbenzene | 6% |
| 4-{Trans-4-(trans-4-propylcyclohexyl)cyclohexyl}-propylbenzene | 16% |
| 4-{Trans-4-(trans-4-propylcyclohexyl)cyclohexyl}-fluorobenzene | 4% |
| 4-{Trans-4-(trans-4-propylcyclohexyl)cyclohexyl}-methoxybenzene | 4% |
| 4-{Trans-4-(trans-4-ethylcyclohexyl)cyclohexyl}-benzonitrile | 3% |
| 4-{Trans-4-(trans-4-propylcyclohexyl)cyclohexyl}-benzonitrile | 6% |
| Other Compounds | |
| 4-Fluorophenyl trans-4-pentylcyclohexanecarboxylate | 8.6% |
| 4-Fluorophenyl trans-4-heptylcyclohexanecarboxylate | 8.6% |
| 4-Fluorophenyl trans-4-(trans-4-propylcyclohexyl)-cyclohexanecarboxylate | 2.9% |
| 4-Fluorophenyl trans-4-(trans-4-pentylcyclohexyl)-cyclohexanecarboxylate | 2.9% |
| 4-(Trans-4-propylcyclohexyl)-2-fluorobenzonitrile | 8% |

The above compounds were mixed to prepare a liquid crystal composition. Characteristic values of the liquid crystal composition are shown in Table 1.

COMPARATIVE EXAMPLE

For comparison, known compounds commonly used as shown below were mixed to prepare a liquid crystal composition. Characteristic values of the liquid crystal composition are shown in Table 1.

| | |
|---|---|
| 4'-Ethyl-4-cyanobiphenyl | 15% |
| 4'-Butyl-4-cyanobiphenyl | 10% |
| 4-Butoxyphenyl trans-4-propylcyclohexanecarboxylate | 16% |
| 4-Ethoxyphenyl trans-4-butylcyclohexanecarboxylate | 12% |
| 4-Methoxyphenyl trans-4-pentylcyclohexanecarboxylate | 12% |
| 4-Ethoxyphenyl trans-4-propylcyclohexanecarboxylate | 10% |
| 4-Ethoxyphenyl trans-4-pentylcyclohexanecarboxylate | 10% |
| 4'-(Trans-4-pentylcyclohexyl)-4-cyanobiphenyl | 15% |

TABLE 1

| Example | NI (°C.) | Δn (25° C.) | η (20° C.) (cp) | $V_{10}$ (25° C.) (V) | α (25° C.) | Nmax (25°) |
|---|---|---|---|---|---|---|
| 1 | 108.5 | 0.106 | 38.7 | 1.47 | 1.066 | 245 |
| 2 | 97.1 | 0.100 | 30.9 | 1.90 | 1.066 | 245 |
| 3 | 80.3 | 0.121 | 26.3 | 1.51 | 1.070 | 219 |
| 4 | 79.4 | 0.099 | 30.5 | 1.60 | 1.062 | 277 |
| 5 | 101.3 | 0.130 | 26.1 | 1.78 | 1.062 | 277 |
| 6 | 88.3 | 0.098 | 26.0 | 1.85 | 1.053 | 376 |
| Com. Ex. | 78.8 | 0.142 | 33.9 | 2.03 | 1.120 | 79 |

NI: clearing point,
Δn: refractive index anisotropy,
η: viscosity,
$V_{10}$: threshold voltage,
α: steepness of voltage-transmittance curve,
Nmax: multiplex number It can be seen from the results of Table 1 that the liquid crystal compositions of the present invention are excellent in characteristics such as clearing point, refractive index anisotropy, threshold voltage, viscosity, and steepness of voltage-transmittance curve.

What is claimed is:
1. A liquid crystal composition containing:
   at least one compound represented by the general formula (I) (first component); and
   at least one compound represented by the general formula (II) (second component) as main components, wherein

General Formula (I):

and $R^1$ is an alkenyl group having 2 to 10 carbon atoms, containing a double bond at any suitable position thereof, and when the double bond is located at a position other than the terminal, in a trans-configuration, and n is an integer of 0 to 4 and wherein General Formula (II):

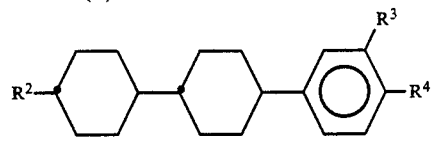

$R^2$ is an alkyl group having 2 to 8 carbon atoms, $R^3$ is H or F; and $R^4$ is an alkyl group having 1 to 8 carbon atoms, an alkoxy group having 1 to 8 carbon atoms, F, or a CN group.

2. The composition as claimed in claim 1, wherein the proportions of the first component, and the second component in the composition are 10 to 40% by weight and 30 to 70% by weight, respectively, based on the total weight of the composition, and the total amount of the first component, and the second component is at least 60% by weight of the composition.

3. A liquid crystal composition as claimed in claim 1 containing:
at least one compound represented by the general formula (I) (first component):
at least one compound represented by the general formula (II) (second component); and
at least one compound selected from the compounds represented by the general formula (III), the compounds represented by the general formula (IV), and the compounds represented by the general formula (V) (third component) as main components, wherein

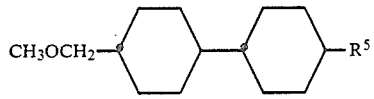

and $R^5$ is an alkyl group having 1 to 5 carbon atoms, wherein

General Formula (IV):

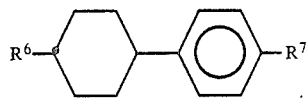

and $R^6$ is an alkyl group having 2 to 8 carbon atoms, and $R^7$ is an alkyl group having 1 to 8 carbon atoms, or an alkoxy group having 1 to 8 carbon atoms, and wherein General Formula (V):

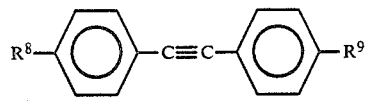

and $R^8$ is an alkyl group having 1 to 8 carbon atoms, and $R^9$ is an alkyl group having 1 to 8 carbon atoms or an alkoxy group having 1 to 8 carbon atoms.

4. The composition as claimed in claim 3, wherein the proportions of the first component, the second component, and the third component in the composition are 10 to 40% by weight, 30 to 70% by weight, and 10 to 30% by weight, respectively, based on the total weight of the composition, and the total amount of the first component, the second component, and the third component is at least 60% by weight of the composition.

5. A liquid crystal composition as claimed in claim 1 containing:
at least one compound represented by the general formula (I) (first component):
at least one compound represented by the general formula (II) (second component); and
at least one compound represented by the general formula (VI) (additional component) as main components, wherein General Formula (VI):

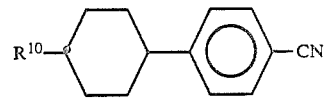

and $R^{10}$ is an alkyl group having 2 to 10 carbon atoms or an alkenyl group having 2 to 10 carbon atoms.

6. The composition as claimed in claim 5, wherein the proportions of the first component, the second component, and the additional component in the composition are 10 to 40% by weight, 30 to 70% by weight, and 10 to 30% by weight, respectively, based on the total weight of the composition, and the total amount of the first component, the second component, and the additional component is at least 60% by weight of the composition.

7. A liquid crystal composition as claimed in claim 3 containing:
at least one compound represented by the general formula (I) (first component);
at least one compound represented by the general formula (II) (second component);
at least one compound selected from the compounds represented by the general formula (III), the compounds represented by the general formula (IV), and the compounds represented by the general formula (V) (third component) as main components; and
at least one compound represented by the general formula (IV) (additional component) as main components wherein General Formula (VI):

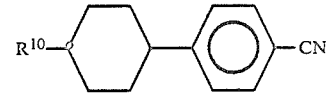

and $R^{10}$ is an alkyl group having 2 to 10 carbon atoms, or an alkenyl group having 2 to 10 carbon atoms.

8. The composition as claimed in claim 7, wherein the proportions of the first component, the second component, the third component, and the additional component in the composition are 10 to 40% by weight, 30 to 70% by weight, 10 to 30% by weight, and 10 to 30% by weight, respectively, based on the total weight of the composition, and the total amount of the first component, the second component, the third component, and the additional component is at least 60% by weight of the composition.

9. The composition as claimed in claim 1, wherein the first component is at least one compound selected from the compounds represented by the general formula (I) in which $R^1$ is a linear alkenyl group having 2 to 6 carbon atoms, and n is an integer of 1 to 4.

10. The composition as claimed in claim 1, wherein the second component is at least one compound selected from the group consisting of compounds represented by the general formulas:

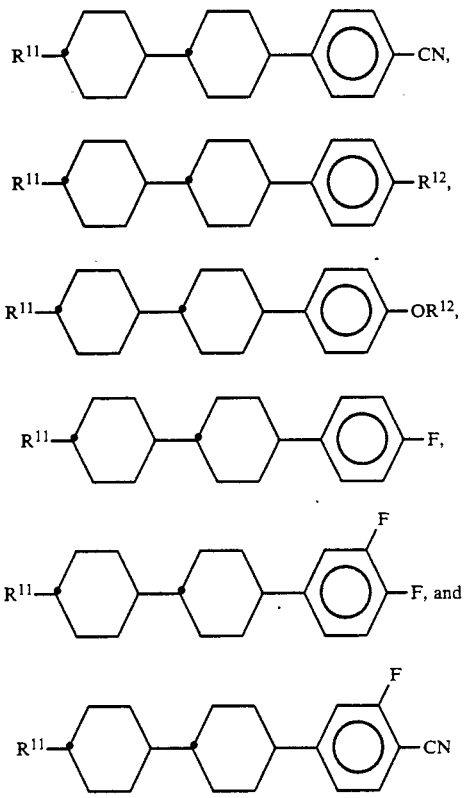
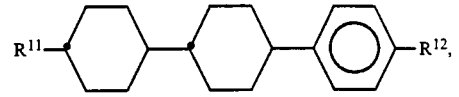
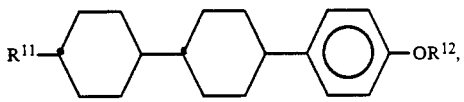
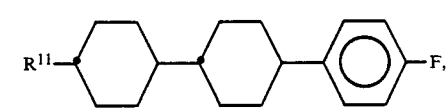
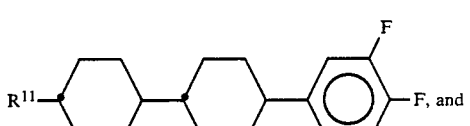
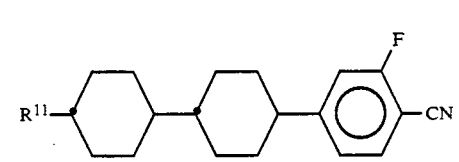

wherein $R^{11}$ is a linear alkyl group having 2 to 6 carbon atoms, and $R^{12}$ is a linear alkyl group having 1 to 5 carbon atoms.

11. The composition as claimed in claim 3, wherein the third component is at least one compound selected from the compounds of the general formula (III) in which $R^5$ is a linear alkyl group having 1 to 5 carbon atoms, the compounds of the general formula (IV) in which $R^6$ is a linear alkyl group having 2 to 5 carbon atoms, and $R^7$ is a linear alkyl group having 1 to 5 carbon atoms, or a linear alkoxy group having 1 to 5 carbon atoms, and the compounds of the general formula (V) in which $R^8$ is a linear alkyl group having 1 to 6 carbon atoms, and $R^9$ is a linear alkyl group having 1 to 6 carbon atoms, or a linear alkoxy group having 1 to 6 carbon atoms.

12. The composition as claimed in claim 5, wherein the additional component is at least one compound selected from the compounds of the general formula (VI) in which $R^{10}$ is a linear alkyl group having 2 to 8 carbon atoms, or a linear alkenyl group having 2 to 8 carbon atoms.

13. The composition as claimed in claim 1 wherein the first component is at least one compound represented by the general formula (I) in which $R^1$ is a linear alkenyl group having 2 to 6 carbon atoms, and n is an integer of 1 to 4, and the second component is at least one compound selected from the group consisting of compounds represented by the following general formulas:

wherein $R^{11}$ is a linear alkyl group having 2 to 6 carbon atoms, and $R^{12}$ is a linear alkyl group having 1 to 5 carbon atoms.

14. The composition as claimed in claim 3 wherein the first component is at least one compound represented by the general formula (I) in which $R^1$ is a linear alkenyl group having 2 to 6 carbon atoms, and n is an integer of 1 to 4, the second component is at least one compound selected from the group consisting of compounds represented by the following general formulas:

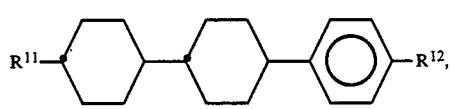
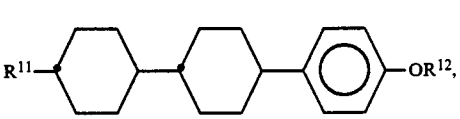
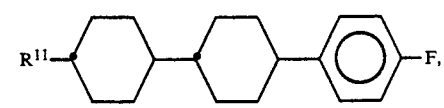

-continued

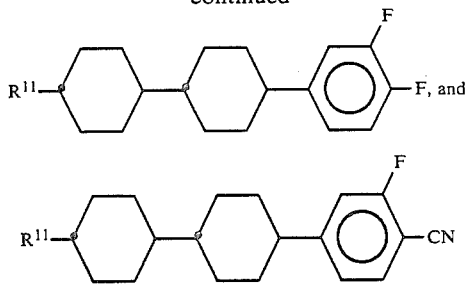

wherein $R^{11}$ is a linear alkyl group having 2 to 6 carbon atoms, and $R^{12}$ is a linear alkyl group having 2 to 6 carbon atoms, and the third component is at least one compound selected from the groups represented by the general formula (III) in which $R^5$ is a linear alkyl group having 1 to 5 carbon atoms, the compounds represented by the general formula (IV) in which $R^6$ is a linear alkyl group having 2 to 5 carbon atoms, and $R^7$ is a linear alkyl group having 1 to 5 carbon atoms, or a linear alkoxy group having 1 to 5 carbon atoms, and the compounds represented by the general formula (V) in which $R^8$ is a linear alkyl group having 1 to 6 carbon atoms, and $R^9$ is a linear alkyl group having 1 to 6 carbon atoms, or a linear alkoxy group having 1 to 6 carbon atoms.

15. The composition as claimed in claim 5 wherein the first component is at least one compound represented by the general formula (I) in which $R^1$ is a linear alkenyl group having 2 to 6 carbon atoms, and n is an integer of 1 to 4, the second component is at least one compound selected from the group consisting of compounds represented by the following general formulas:

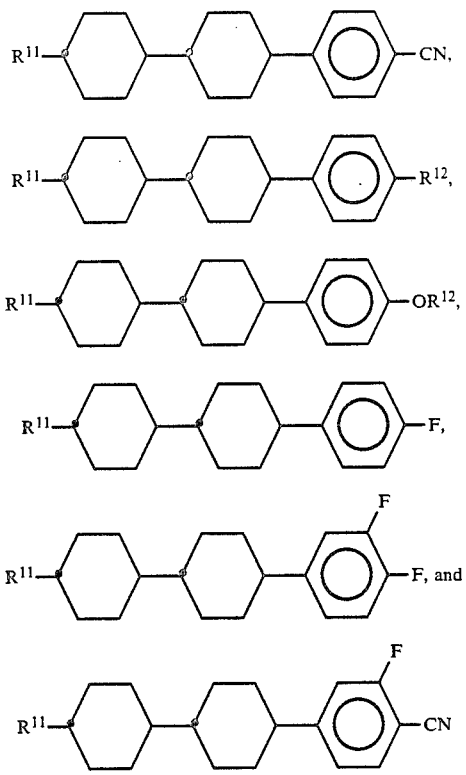

wherein $R^{11}$ is a linear alkyl group having 2 to 6 carbon atoms, and $R^{12}$ is a linear alkyl group having 1 to 5 carbon atoms, and the additional component is at least one compound represented by the general formula (VI) in which $R^{10}$ is a linear alkyl group having 2 to 8 carbon atoms, or a linear alkenyl group having 2 to 8 carbon atoms.

16. The composition as claimed in claim 7 wherein the first component is at least one compound represented by the general formula (I) in which $R^1$ is a linear alkenyl group having 2 to 6 carbon atoms, and n is an integer of 1 to 4, the second component is at least one compound selected from the group consisting of compounds represented by the following general formulas:

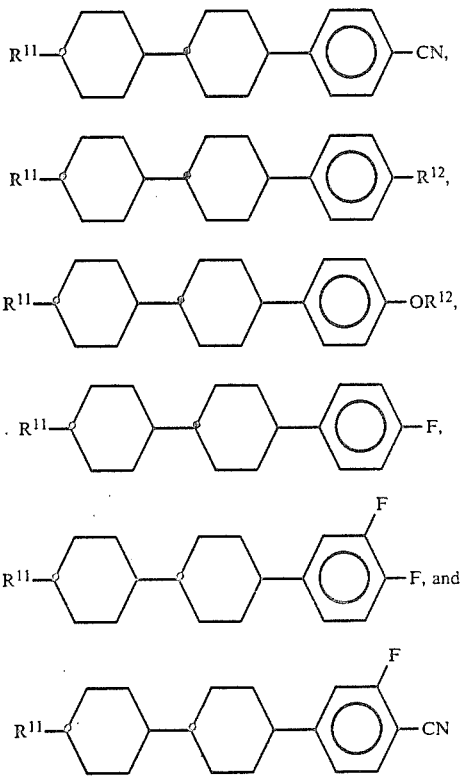

wherein $R^{11}$ is a linear alkyl group having 2 to 6 carbon atoms, and $R^{12}$ is a linear alkyl group having 1 to 5 carbon atoms, the third component is at least one compound selected from the compounds represented by the general formula (III) in which $R^5$ is a linear alkyl group having 1 to 5 carbon atoms, the compounds represented by the general formula (IV) in which $R^6$ is a linear alkyl group having 2 to 5 carbon atoms, and $R^7$ is a linear alkyl group having 1 to 5 carbon atoms, or a linear alkoxy group having 1 to 5 carbon atoms, and the compounds represented by the general formula (V) in which $R^8$ is a linear alkyl group having 1 to 6 carbon atoms, and $R^9$ is a linear alkyl group having 1 to 6 carbon atoms, or a linear alkoxy group having 1 to 6 carbon atoms, and the additional component is at least one compound represented by the general formula (VI) in which $R^{10}$ is a linear alkyl group having 2 to 8 carbon atoms, or a linear alkenyl group having 2 to 8 carbon atoms.

17. The liquid crystal composition as claimed in claim 1, further containing at least one other known liquid crystal compound or mesogenic compound.

18. A liquid crystal display device using a liquid crystal composition as claimed in claim 1.

UNITED STATES PATENT AND TRADEMARK OFFICE
CERTIFICATE OF CORRECTION

PATENT NO. : 5,102,577
DATED : April 7, 1992
INVENTOR(S) : Uchida et al.

It is certified that error appears in the above-identified patent and that said Letters Patent is hereby corrected as shown below:

Claim 1, column 14, line 59, change "4and" to --4 and--;

" " column 15, line 1, before "$R^2$" insert --and--.

Claim 7, column 16, line 40, change "(IV)" to --(VI)--.

Signed and Sealed this

Thirteenth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,102,577

DATED : April 7, 1992

INVENTOR(S) : Uchida et al.

It is certified that error appears in the above-identified patent and that said Letters Patent is hereby corrected as shown below:

Column 3, line 5, above the formula insert --<u>General Formula (III)</u>:--.

Column 8, in the fourth formula, change "$R^4$" to --$R^{14}$--.

Claim 3, column 15, line 25, after line 23 but before line 26, insert --General Formula (III)--.

Signed and Sealed this

Ninth Day of November, 1993

Attest:

BRUCE LEHMAN

Attesting Officer

Commissioner of Patents and Trademarks